United States Patent
Huang et al.

(10) Patent No.: US 9,565,283 B2
(45) Date of Patent: Feb. 7, 2017

(54) METHOD AND APPARATUS FOR PROCESSING COMMUNICATION IDENTIFICATION

(71) Applicant: Xiaomi Inc., Beijing (CN)

(72) Inventors: Fei Huang, Beijing (CN); Xiehao Bao, Beijing (CN); Kun Niu, Beijing (CN)

(73) Assignee: Xiaomi Inc., Beijing (CN)

( * ) Notice: Subject to any disclaimer, the term of this patent is extended or adjusted under 35 U.S.C. 154(b) by 32 days.

(21) Appl. No.: 14/712,081

(22) Filed: May 14, 2015

(65) Prior Publication Data

US 2016/0057262 A1    Feb. 25, 2016

Related U.S. Application Data

(63) Continuation of application No. PCT/CN2015/071345, filed on Jan. 22, 2015.

(30) Foreign Application Priority Data

Aug. 25, 2014  (CN) .......................... 2014 1 0422952

(51) Int. Cl.
*H04M 3/42* (2006.01)
*H04M 1/2745* (2006.01)

(52) U.S. Cl.
CPC . *H04M 1/274583* (2013.01); *H04M 1/274508* (2013.01); *H04M 2250/60* (2013.01)

(58) Field of Classification Search
CPC ................ H04M 1/274583; H04M 1/274508; H04M 2250/60
USPC ....................................... 455/414.1; 370/338
See application file for complete search history.

(56) References Cited

U.S. PATENT DOCUMENTS

| 2006/0084478 A1* | 4/2006 | Erlichmen ...... H04M 1/274583 455/566 |
| 2008/0207271 A1 | 8/2008 | Krutik et al. |
| 2012/0036261 A1* | 2/2012 | Salazar .................. H04L 67/24 709/225 |

FOREIGN PATENT DOCUMENTS

| CN | 1429044 A | 7/2003 |
| CN | 1434619 A | 8/2003 |
| CN | 1492705 A | 4/2004 |
| CN | 101365008 A | 2/2009 |
| CN | 101656775 A | 2/2010 |
| CN | 101668082 A | 3/2010 |
| CN | 101969505 A | 2/2011 |
| CN | 102104685 A | 6/2011 |
| CN | 102148886 A | 8/2011 |

(Continued)

OTHER PUBLICATIONS

Extended European Search Report of European Application No. 15180909.2, mailed Dec. 14, 2015, issued by the European Patent Office (9 pages).

(Continued)

*Primary Examiner* — Marcos Batista
(74) *Attorney, Agent, or Firm* — Finnegan, Henderson, Farabow, Garrett & Dunner LLP

(57) ABSTRACT

A method for processing communication identifications includes obtaining communication records corresponding to a plurality of communication identifications of a current user, determining use frequencies of the communication identifications according to the communication records, and determining one of the communication identifications as a frequently-used communication identification according to the use frequencies.

15 Claims, 10 Drawing Sheets

(56) References Cited

FOREIGN PATENT DOCUMENTS

| | | |
|---|---|---|
| CN | 103051801 A | 4/2013 |
| CN | 103124254 A | 5/2013 |
| CN | 103167171 A | 6/2013 |
| CN | 103581846 A | 2/2014 |
| CN | 104168356 A | 11/2014 |
| EA | 010602 B1 | 10/2008 |
| JP | 11-112636 A | 4/1999 |
| JP | 2004-364129 A | 12/2004 |
| JP | 2008-131418 A | 6/2008 |
| JP | 2010073119 A | 4/2010 |
| RU | 2408153 C2 | 12/2010 |
| WO | WO 2008/133578 A1 | 11/2008 |

OTHER PUBLICATIONS

English translation of International Search Report of International Application No. PCT/CN2015/071345, dated May 12, 2015, issued by State Intellectual Property Office of the P.R. China as the ISA (2 pages).
International Search Report of International Patent Application No. PCT/CN2015/071345, from the State Intellectual Property Office of China (ISA/CN), mailed May 12, 2015 (4 pages).
Notification on Results of Examining Patentability of Invention dated Oct. 13, 2016 in counterpart Russian Application No. 2015114082/08(022055) and English translation thereof.

* cited by examiner

METHOD AND APPARATUS FOR PROCESSING COMMUNICATION IDENTIFICATION

CROSS-REFERENCE TO RELATED APPLICATIONS

This application is a continuation of International Application No. PCT/CN2015/071345, filed on Jan. 22, 2015, which is based upon and claims priority to Chinese Patent Application No. 201410422952.2, filed on Aug. 25, 2014, the entire contents of both of which are incorporated herein by reference.

TECHNICAL FIELD

The present disclosure relates to communication and computer processing and, more particularly, to a method and an apparatus for processing communication identification.

BACKGROUND

With the development of Internet technology, people can contact and communicate with each other in various ways such as telephone, SMS, email, and IM (instant messaging). Further, a person may have multiple phone numbers, email addresses, IM accounts, or the like.

Sometimes, multiple phone numbers of a friend may be saved in an address book. When a user needs to call the friend, it may be difficult for the user to determine which phone number to dial. If the user randomly picks a phone number to dial, that number may not be used by the friend very often, and thus it is likely that the friend will miss the call.

Therefore, in the related art, if a friend has a plurality of communication identifications, it is possible that the attempt to contact the friend will fail.

SUMMARY

In accordance with the present disclosure, there is provided a method for processing communication identifications. The method includes obtaining communication records corresponding to a plurality of communication identifications of a current user, determining use frequencies of the communication identifications according to the communication records, and determining one of the communication identifications as a frequently-used communication identification according to the use frequencies.

Also in accordance with the present disclosure, there is provided an apparatus for processing communication identification. The apparatus includes a processor and a non-transitory computer-readable storage medium storing instructions. The instructions, when executed by the processor, cause the processor to obtain communication records corresponding to a plurality of communication identifications of a current user, determine use frequencies of the communication identifications according to the communication records, and determine one of the communication identifications as a frequently-used communication identification according to the use frequencies.

Also in accordance with the present disclosure, there is provided a non-transitory computer-readable storage medium storing instructions that, when executed by a processor of a terminal, cause the terminal to obtain communication records corresponding to a plurality of communication identifications of a current user, determine use frequencies of the communication identifications according to the communication records, and determine one of the communication identifications as a frequently-used communication identification according to the use frequencies.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate embodiments consistent with the invention and, together with the description, serve to explain the principles of the invention.

DESCRIPTION OF THE EMBODIMENTS

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of apparatuses and methods consistent with aspects related to the invention as recited in the appended claims. Methods consistent with the present disclosure may be implemented in a mobile terminal or a server.

Consistent with embodiments of the present disclosure, an address book in a mobile terminal of a user A may have stored therein a plurality of phone numbers of a user B, e.g., a phone number 1 and a phone number 2. For example, the phone number 1 is a phone number that was often used by the user B in the past. The phone number 2 is a phone number often used by the user B now. Consistent with embodiments of the present disclosure, usage of each of user B's phone numbers is analyzed according to call records of the user B, to determine a frequency of use (also referred to as a "use frequency") for each phone number. A frequently-used phone number is determined according to the use frequencies of the phone numbers. A phone number is one example of a communication identification according to the present disclosure. Other communication identifications can include, for example, email address, IM account, or the like.

Figure 1:
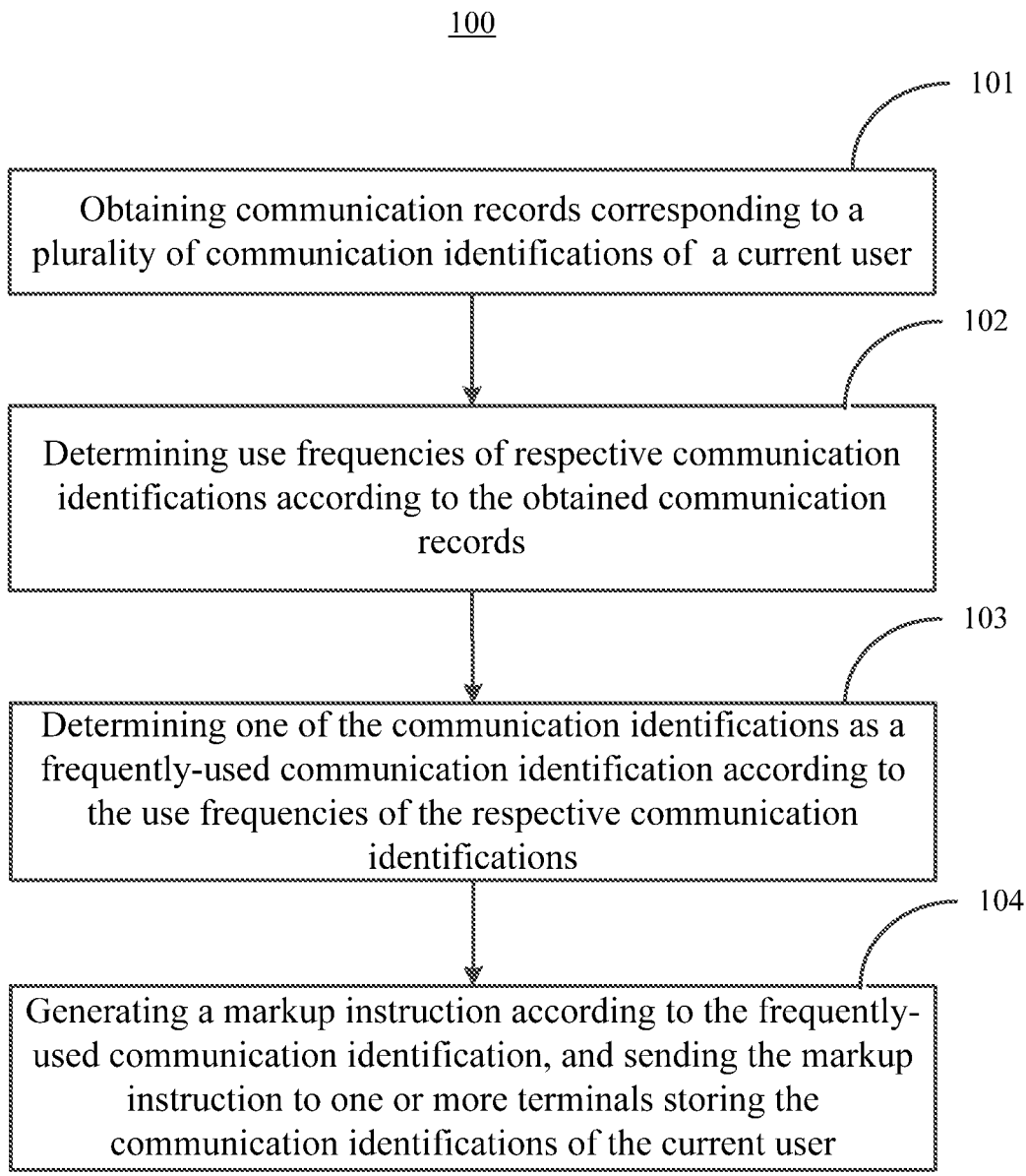
FIG. 1 is a flow chart showing a method for processing communication identifications according to an exemplary embodiment.

FIG. 1 is a flow chart showing a method 100 for processing communication identifications according to an exemplary embodiment. The method 100 may be implemented by a mobile terminal or a server. As shown in FIG. 1, at 101, communication records corresponding to a plurality of communication identifications of a current user are obtained. The communication identifications include, but are not limited to, phone number, E-mail address, or the like. At 102, use frequencies of the communication identifications are determined according to the obtained communication records. At 103, one of the communication identifications is determined as a frequently-used communication identification according to the use frequencies of the communication identifications. For example, the communication identification having the highest use frequency is determined as the frequently-used communication identification. At 104, a markup instruction is generated according to the frequently-used communication identification. The markup instruction is sent to one or more terminals storing the communication identifications of the current user, for the one or more terminals to mark the frequently-used communication identification of the current user.

That is, consistent with the present disclosure, degrees of use of a plurality of communication identifications are judged according to actual communication records. The most frequently-used communication identification is determined, and another user is informed of the most frequently-used communication identification. Therefore, the other user can contact the current user using the most frequently-used communication identification.

For example, assuming the user A has communication identifications 1 to 3, the use frequency is obtained for each of the communication identifications 1 to 3. The use frequency of the communication identification 1 is 120, the use frequency of the communication identification 2 is 150, and the use frequency of the communication identification 3 is 40. The use frequency of the communication identification 2 is the highest, which indicates that the user A or friends of the user A often use the communication identification 2 for communication. Therefore, the communication identification 2 is determined as the frequently-used communication identification, and other users are informed of this. If the user B previously contacted the user A using the communication identification 1 in the past, after receiving the notification, the user B may use the communication identification 2 to communicate with the user A, which may improve the success rate of communication.

In some embodiments, the communication identification may be a phone number, an email account, an IM account, or the like. The other users may be contacts in an address book. The address book may be a phone address book, an address book in email, a friend list in IM software, or the like.

In some embodiments, the communication records obtained at 101 may come from one user, i.e., the current user, or from a plurality of users. Obtaining communication records from a plurality of users allows more data to be used in the subsequent determination of the use frequency, so that the determination of the use frequency can be more accurate. In some embodiments, the users providing communication records may be limited to the users in the address book, to reduce the interference of communications records from unknown users, so as to reduce the interference of communications records of advertising promotion.

According to the present disclosure, the method shown in FIG. 1 can be implemented by a mobile terminal, or by a server.

If the method is implemented by a mobile terminal, the mobile terminal determines the use frequencies of respective local communication identifications according to local communication records or other users' communication records obtained via a network, determines the frequently-used communication identification, and sends the frequently-used communication identification to other users via the network. The network may be a wired network or a wireless network, such as WiFi, Bluetooth, NFC, or the like. The mobile terminal may send the frequently-used communication identification to one or more other users in the form of SMS, email, IM message, or the like. Other users mark the communication identification as the frequently-used communication identification in their local address books after receiving the frequently-used communication identification sent by the terminal.

If the method is implemented by a server, the server obtains communication records from a plurality of users. For the respective communication identifications of each of the users, the server determines the use frequency according to the communication records related to the user. Then, the server determines the frequently-used communication identification for each user, and sends the determined frequently-used communication identification of one user to other users. Similar to the mobile terminal, the server may use a network to obtain the communication records from the plurality of users and send the frequently-used communication identification to the other users, in the form of SMS's, emails, IM messages, software configuration, data synchronization, or the like.

In some embodiments, the use frequency of a communication identification can be determined according to the communications sent through the communication identification or the communications received through the communication identification. The frequently-used communication identification can then be determined. Approaches I and II below include determination of the frequently-used communication identification at 102 and 103 of the method 100 based on communications sent or received through each communication identifications.

According to Approach I, the use frequencies of respective communication identifications as receivers are determined according to the obtained communication records. The communication identification with the highest use frequency is determined according to these use frequencies. Generally, for other users to contact the current user, the communication identification that the current user most frequently uses when it acts as a receiver may be the best candidate for the frequently-used communication identification. Thus, the frequently-used communication identification determined according to this approach may be more accurate.

For example, the user A has communication identifications 1 to 3, the use frequencies of the communication identifications 1 to 3 used as receivers are determined. If there are 50 communication records in which the communication identification 1 is a sender and there are 20 communication records in which the communication identification 1 is a receiver, then the use frequency of the communication identification 1 as a receiver is 20. If there are 10 communication records in which the communication identification 2 is a sender and there are 60 communication records in which the communication identification 2 is a receiver, then the use frequency of the communication identification 2 as a receiver is 60. If there are 30 communication records in which the communication identification 3 is a sender and there are 30 communication records in which the communication identification 3 is a receiver, then the use frequency of the communication identification 3 as a receiver is 30. Therefore, the use frequency of the communication identification 2 used as a receiver is the highest, which indicates that other users often use the communication identification 2 to contact the user A, and the communication identification 2 is determined as the frequently-used communication identification.

According to Approach II, the use frequencies of respective communication identifications as senders are determined according to the obtained communication records. The communication identification with the highest use frequency is determined according to these use frequencies. The frequently-used communication identification determined according to this approach is a communication identification that the user often uses to contact other users, and thus contacting the user through that communication identification is also likely to succeed. Moreover, in a situation where not many communication records are obtained from other user, the statistical result based on those communication records is not accurate enough. In this scenario, the result obtained by only considering the use frequency of the communication identification as a sender may be more accurate and reliable than that obtained by considering the entire use frequency of the communication identification.

In some embodiments, at 102 and 103 of the method 100, the use frequency of each communication identification when used as a sender is compared with when used as a receiver, and the frequently-used communication identification is determined considering the result of the comparison, such as described below in Approach III.

According to Approach III, the use frequencies of respective communication identifications when used as senders and when used as receivers are respectively determined according to the obtained communication records. For each of the communication identifications, whether the communication identification is frequently used as a receiver is judged according to the use frequencies of the communication identification when used as a sender and when used as a receiver. The communication identification that is frequently used as a receiver is determined as the communication identification with the highest use frequency.

For example, the user A has communication identifications 1 to 3. The use frequencies of the communication identifications 1 to 3 when used as receivers and when used as senders are determined. For example, there are 50 communication records in which the communication identification 1 is a sender, and there are 20 communication records in which the communication identification 1 is a receiver. There are 10 communication records in which the communication identification 2 is a sender, and there are 60 communication records in which the communication identification 2 is a receiver. There are 30 communication records in which the communication identification 3 is a sender, and there are 30 communication records in which the communication identification 3 is a receiver. Thus, the use frequency of the communication identification 1 as a sender is $(50/20)*(70/(70+70+60))=0.875$, and the use frequency of the communication identification 1 as a receiver is $(20/50)*(70/(70+70+60))=0.14$. As such, the use frequency of the communication identification 1 as a sender is higher than the use frequency of the communication identification 1 as a receiver, which indicates that the communication identification 1 is mainly used to send information. Similarly, the use frequency of the communication identification 2 as a sender is $(10/60)*(70/(70+70+60))=0.058$, and the use frequency of the communication identification 2 as the receiver is $(60/10)*(70/(70+70+60))=2.1$, which indicates that the communication identification 2 is mainly used to receive information. Finally, the use frequency of the communication identification 3 as a sender is $(30/30)*(60/(70+70+60))=0.3$, and the use frequency of the communication identification 2 as a receiver is $(30/30)*(60/(70+70+60))=0.3$, which indicates that the use frequencies of the communication identification 3 when used as a receiver and when used as a sender are relatively balanced, and are both lower than the use frequency of the communication identification 1 when used as a sender and the use frequency of the communication identification 2 when used as a receiver.

Since the use frequency of the communication identification 2 when used as a receiver is obviously higher than that when used as a sender, i.e., the difference between them is greater than a preset threshold, the communication identification 2 is determined as the frequently-used communication identification.

In some embodiments, in order to highlight the role of a receiver, at 102 of the method 100, the communication records in which a communication identification is a receiver and the communication records in which the communication identification is a sender can be assigned different weights, such as described below in Approach IV.

According to Approach IV, the use frequencies of respective communication identifications when used as senders are determined according to a preset first weight value and obtained communication records, and the use frequencies of the respective communication identifications when used as receivers are determined according to a preset second weight value and the obtained communication records. Here, the second weight value is greater than the first weight value.

In some embodiments, 102 and 103 in the method 100 may be carried out as described below in Approach V. In this approach, the use frequency of a communication identification when used as a sender is compared with the use frequency when used as a receiver.

According to Approach V, the use frequencies of respective communication identifications when used as senders and when used as receivers are determined according to the obtained communication records. For each of the respective communication identifications, whether a difference value between the use frequency of the communication identification when used as a sender and the use frequency of the communication identification when used as a receiver is in a preset difference range (such as −0.5~0.5) is judged. If the difference value of a communication identification is within the preset difference range, then that communication identification is determined to be a receiver. Among those communication identifications that are determined as receivers, the one with the highest use frequency when used as a receiver is determined as the frequently-used communication identification.

In this approach, the priority of a communication identification when used as a receiver is higher than the priority when used as a sender. If the use frequency of the communication identification when used as a sender is not significantly higher than the use frequency when used as a receiver, the communication identification is determined to be a receiver and is considered in determining the frequently-used communication identification. This approach can determine the frequently-used communication identification more accurately.

In some embodiments, 102 and 103 in the method 100 may be carried out as described below in Approach VI.

According to Approach VI, the use frequencies of respective communication identifications when used as receivers are determined according to the obtained communication records, and the highest use frequency among these use frequencies is determined. Whether this highest use frequency is greater than a preset receiver threshold is judged. If so, the communication identification corresponding to the highest use frequency when used as a receiver is determined as the frequently-used communication identification.

In this approach, for friends of a user, the user is usually a receiver of communications. Therefore, the use frequency of the communication identification when used as a receiver is paid more attention and whether the communication identification is the frequently-used communication identification is judged accordingly. The frequently-used communication identification determined according to this approach is convenient for the friends to contact the user, and is more accurate.

In some embodiments, 102 in the method 100 may also be carried out as described below in Approach VII.

According to Approach VII, the use frequencies of respective communication identifications when used as receivers are determined according to connection states of the communication records and weights corresponding to the connection states. For example, the communication records are call records, and the connection states include a state in which there is a call signal and the called party answers, a state in which there is a call signal and the called party does not answer, and a state in which there is no call signal. These connection states are respectively assigned a third weight, a fourth weight, and a fifth weight, where the third weight is greater than the fourth weight and the fourth weight is greater than the fifth weight.

In this approach, different weights are assigned to different states of calling, and the highest weight is assigned to the state in which there is a call signal and the called party answers. Therefore, the use frequency obtained according to this approach is more accurate, and correspondingly the determined frequently-used communication identification is more accurate, so that it is convenient for the user's friends to contact the user.

In some embodiments, 102 of the method 100 may also be carried out as described below in Approach VIII.

According to Approach VIII, the use frequencies of respective communication identifications are determined according to the timing and numbers of the communication records obtained in a preset time period. That is, a communication record closer to the current time is assigned a greater weight. In some embodiments, the weight is linearly dependent on time, such as one-dimensional or two-dimensional linear variation.

For example, the communication records in the past month can be assigned a weight of 100, the communication records of more than 1 month but less than 6 months can be assigned a weight of 50, the communication records of more than 6 months but less than 12 months can be assigned a weight of 5, and the communication records of more than 12 months ago can be assigned a weight of 0.

In some embodiments, one or more of Approaches I-VIII may be combined.

In some embodiments, communication records of different types may be assigned weights according to different manners. For example, the manner for assigning weights to different call records is described above in Approach VII. As another example, if the communication records are email records, an email record in which the email has been replied to or forwarded can be assigned a greater weight than an email record in which the email has not been replied to or forwarded. As a further example, if the communication records are IM records, an IM record in which a reply is received within a preset time length can be assigned a greater weight than an IM record in which a reply is not received within the preset time length.

Figure 2:
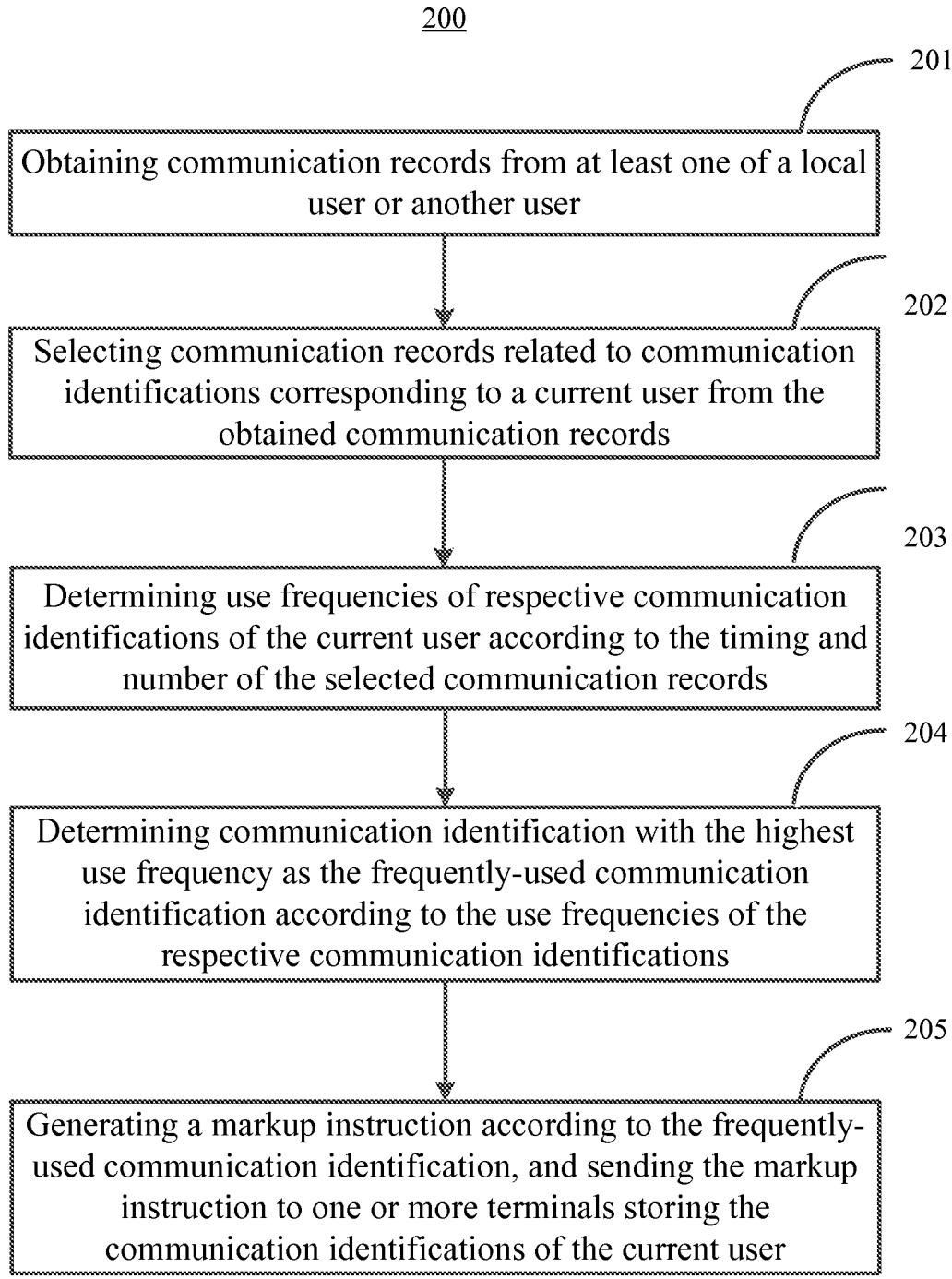
FIG. 2 is a flow chart showing a method for processing communication identifications according to another exemplary embodiment.

FIG. 2 is a flow chart showing a method 200 for processing communication identifications according to an exemplary embodiment. The method may be implemented by a mobile terminal. As shown in FIG. 2, at 201, communication records are obtained from at least one of a local user or another user.

At 202, communication records related to communication identifications corresponding to a current user, i.e., communication records in which the communication identifications of the current user is a sender or receiver, are selected from the obtained communication records.

At 203, use frequencies of respective communication identifications of the current user are determined according to the timing and numbers of the selected communication records.

At 204, a communication identification with the highest use frequency is determined as the frequently-used communication identification according to the use frequencies of the respective communication identifications.

At 205, a markup instruction is generated according to the frequently-used communication identification, and the markup instruction is sent to one or more terminals storing the communication identifications of the current user, for the one or more terminals to mark the frequently-used communication identification of the current user. Other users can mark the received communication identification as the frequently-used communication identification.

Figure 3:
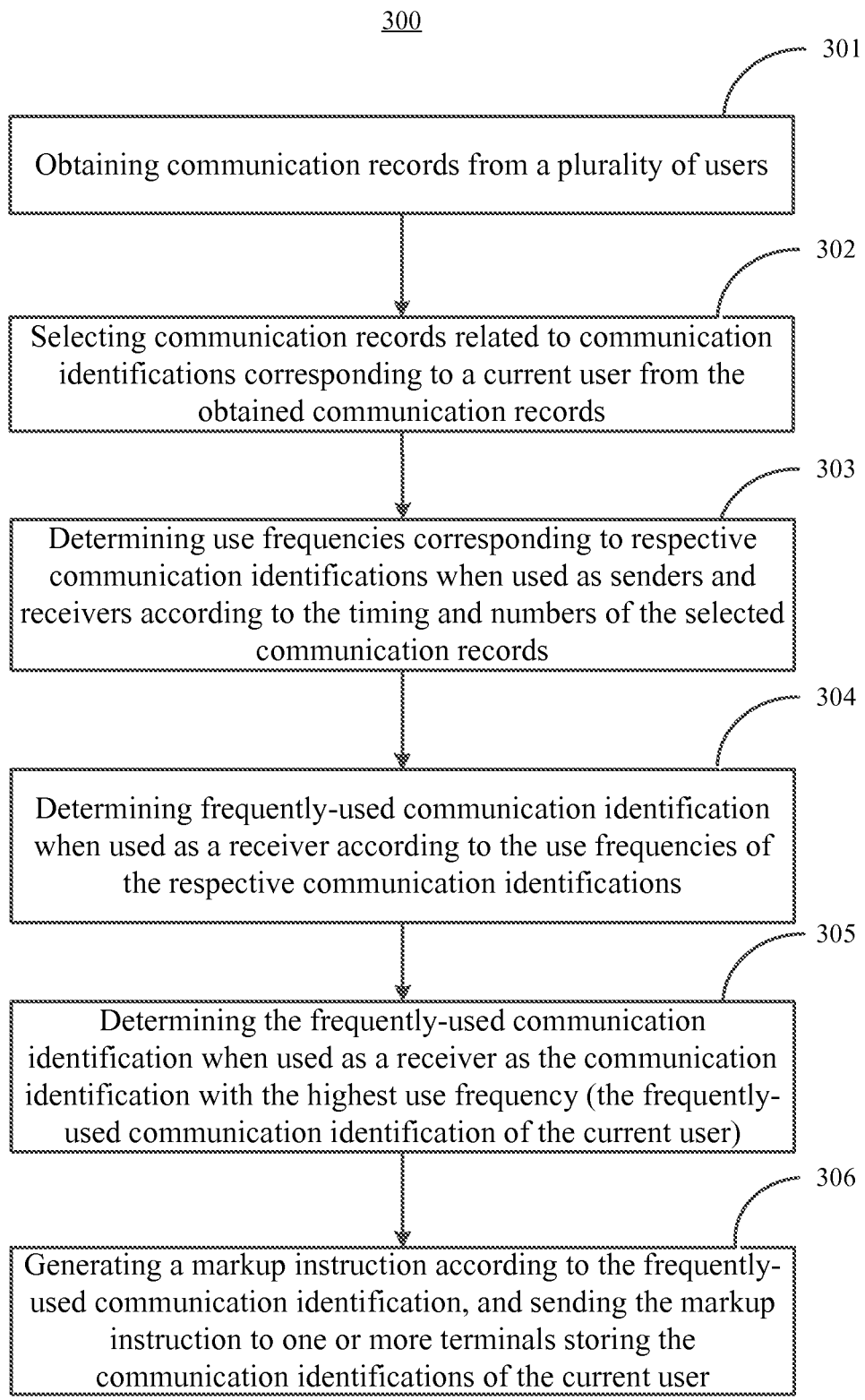
FIG. 3 is a flow chart showing a method for processing communication identifications according to a further exemplary embodiment.

FIG. 3 is a flow chart showing a method 300 for processing communication identifications according to an exemplary embodiment. The method 300 may be implemented by a server. As shown in FIG. 3, at 301, communication records are obtained from a plurality of users. For each of the plurality of users (referred to as a "current user" in the description of the method 300), the server continues to perform the following part of the method 300.

At 302, communication records related to communication identifications corresponding to the current user are selected from the obtained communication records. According to the present disclosure, the server may receive communication records sent by the current user, or locate communication records associated with the current user in a local storage of the server. For example, the server receives the communication records sent by the current user through an IM account 1, and a phone number 1, a phone number 2, an email address 1, and an email address 2 bound with the IM account 1 are stored in the local storage of the server. The server can pick the communication records associated with the IM account 1, the phone number 1, the phone number 2, the email address 1, and the email address 2. The server may also categorize the communication records into those respectively corresponding to IM accounts, phone numbers, and email addresses.

At 303, use frequencies of respective communication identifications when used as senders and when used as receivers are determined according to the timing and numbers of the selected communication records.

At 304, the frequently-used communication identification when used as a receiver is determined according to the use frequencies of the respective communication identifications.

For example, the server may identify the communication identification with the highest use frequency from the use frequencies of the IM account 1, the phone number 1, the phone number 2, the email address 1, and the email address 2, so that a more appropriate communication manner can be determined. For example, if the communication identification with the highest use frequency is the IM account 1, then this indicates that the current user is easier to be contacted through IMs compared to telephones and emails.

In some embodiments, the server classifies the communication identifications and determines a communication identification with the highest use frequency for each class. For example, for phone numbers, the server determines the one with the highest use frequency based on the use frequencies of the phone number 1 and the phone number 2.

At 305, the frequently-used communication identification when used as a receiver is determined as the communication identification with the highest use frequency, i.e., the frequently-used communication identification of the current user.

At 306, a markup instruction is generated according to the frequently-used communication identification, and the markup instruction is sent to one or more terminals storing the communication identifications of the current user.

Figure 4:
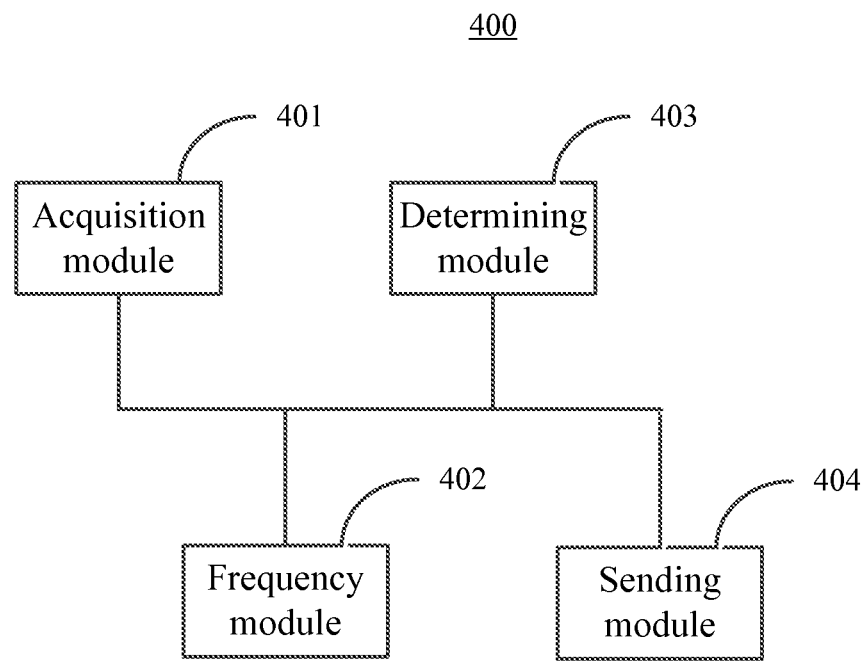
FIG. 4 is a block diagram showing an apparatus for processing communication identifications according to an exemplary embodiment.

FIG. 4 is a block diagram showing an apparatus 400 for processing communication identifications according to an exemplary embodiment. Referring to FIG. 4, the apparatus 400 includes an acquisition module 401, a frequency module 402, a determining module 403, and a sending module 404. The apparatus 400 may be a mobile terminal or a server. The acquisition module 401 is configured to obtain communication records corresponding to a plurality of communication identifications of a current user. The frequency module 402 is configured to determine use frequencies of respective communication identifications according to the obtained communication records. The determining module 403 is configured to determine a communication identification with the highest use frequency as a frequently-used communication identification according to the use frequencies of the respective communication identifications.

The sending module 404 is configured to generate a markup instruction according to the frequently-used communication identification, and send the markup instruction to one or more terminals storing the communication identifications of the current user, for the one or more terminals to mark the frequently-used communication identification.

Figure 5:
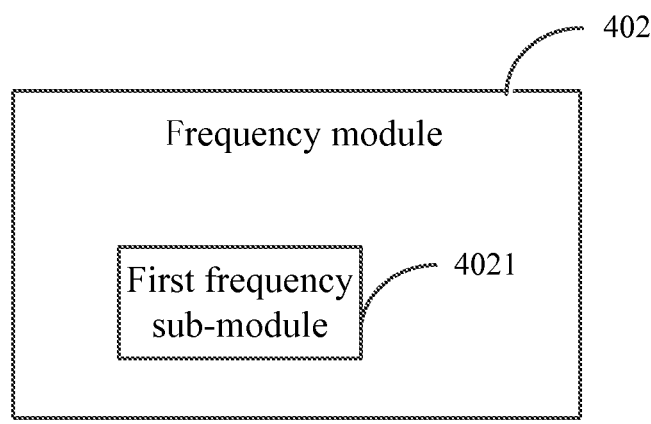
FIG. 5 is a block diagram showing a frequency module according to an exemplary embodiment.
Figure 6:
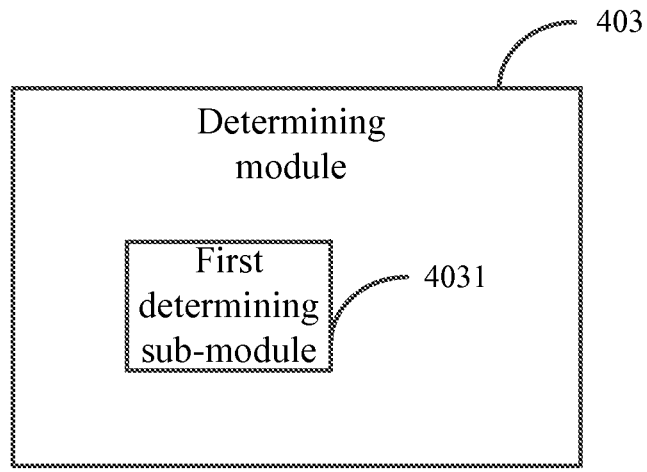
FIG. 6 is a block diagram showing a determining module according to an exemplary embodiment.

In some embodiments, as shown in FIGS. 5 and 6, the frequency module 402 includes a first frequency sub-module 4021 and the determining module includes a first determining sub-module 4031. The first frequency sub-module 4021 is configured to determine the use frequencies of the respective communication identifications when used as receivers or when used as senders according to the obtained communication records. The first determining sub-module 4031 is configured to determine the communication identification with the highest use frequency according to the use frequencies of the respective communication identifications when used as receivers or when used as senders.

Figure 7:
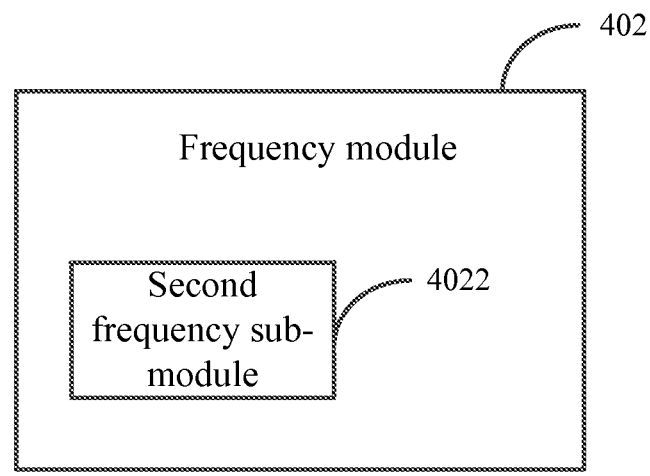
FIG. 7 is a block diagram showing a frequency module according to another exemplary embodiment.
Figure 8:
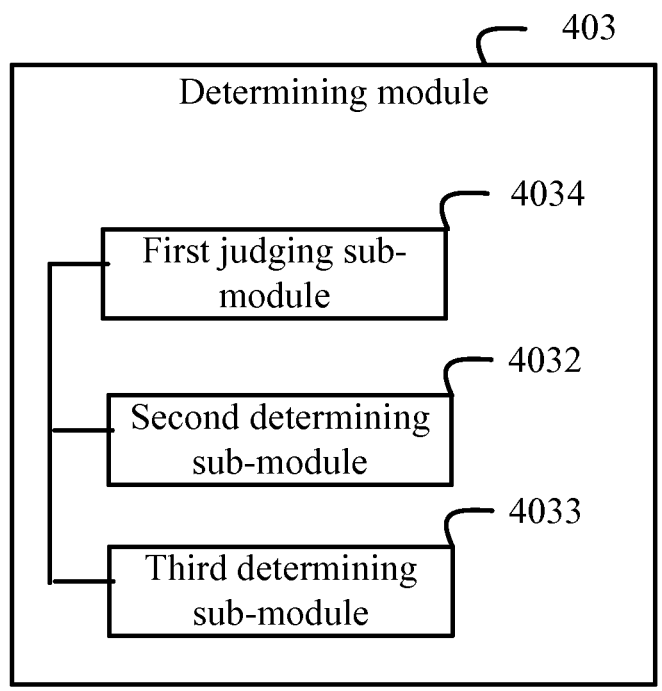
FIG. 8 is a block diagram showing a determining module according to another exemplary embodiment.

In some embodiments, as shown in FIGS. 7 and 8, the frequency module 402 includes a second frequency sub-module 4022, and the determining module 403 includes a first judging sub-module 4034, a second determining sub-module 4032, and a third determining sub-module 4033.

The second frequency sub-module 4022 is configured to determine the use frequencies of the respective communication identifications when used as senders and when used as receivers, respectively, according to the obtained communication records.

The first judging sub-module 4034 is configured to judge whether a difference value between the use frequency of each communication identification when used as a sender and the use frequency of that communication identification when used as a receiver is in a preset difference range. The second determining sub-module 4032 is configured to determine a communication identification as a receiver if the difference value corresponding to a communication identification is within the preset difference range, and to determine the use frequency of that communication identification. The third determining sub-module 4033 is configured to determine, from those communication identifications that are determined to be receivers, the communication identification with the highest use frequency as the frequently-used communication identification.

Figure 9A:
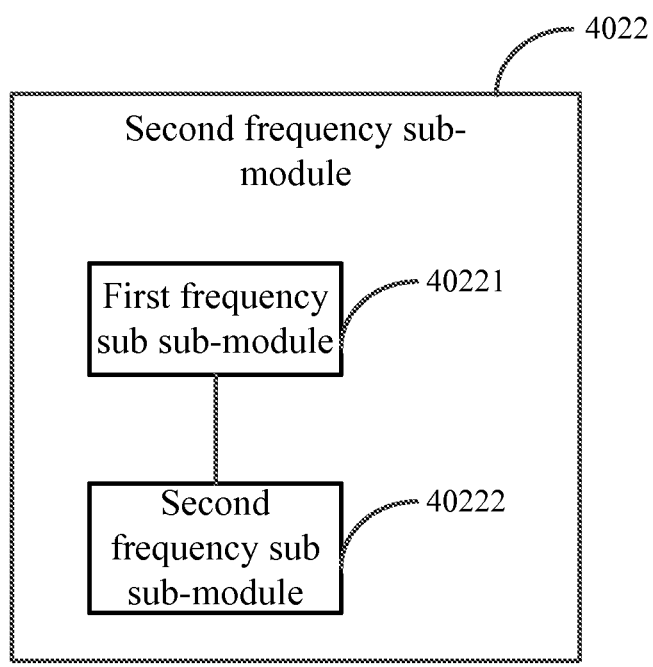
FIG. 9A is a block diagram showing a second frequency sub-module according to an exemplary embodiment.

In some embodiments, as shown in FIG. 9A, the second frequency sub-module 4022 includes a first frequency sub sub-module 40221 and a second frequency sub sub-module 40222. The first frequency sub sub-module 40221 is configured to determine the use frequencies of the respective communication identifications when used as senders according to a preset first weight and the obtained communication records. The second frequency sub sub-module 40222 is configured to determine the use frequencies of the respective communication identifications when used as receivers according to a preset second weight and the obtained communication records. Here, the second weight is greater than the first weight.

Figure 9B:
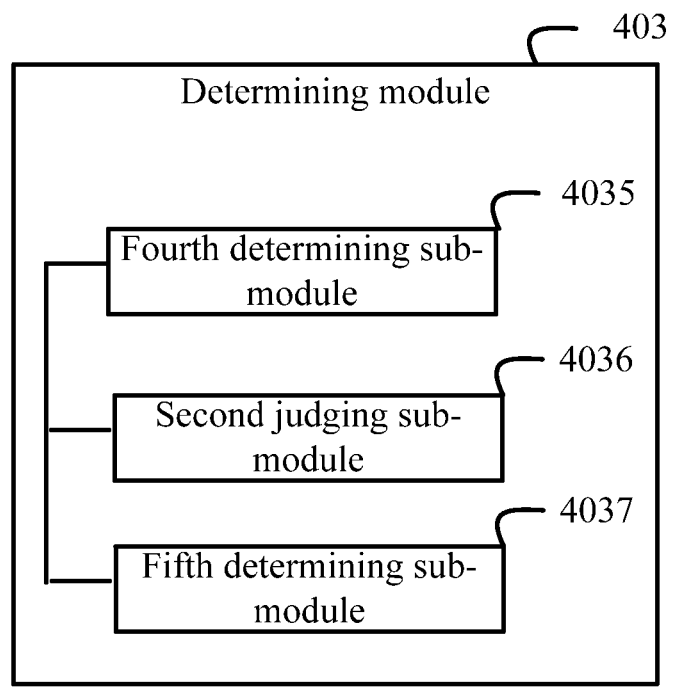
FIG. 9B is a block diagram showing a determining module according to a further exemplary embodiment.

In some embodiments, as shown in FIG. 9B, the determining module 403 includes a fourth determining sub-module 4035, a second judging sub-module 4036, and a fifth determining sub-module 4037. The fourth determining sub-module 4035 is configured to determine the highest use frequency among the use frequencies of the respective communication identifications when used as receivers. The second judging sub-module 4036 is configured to judge whether this highest use frequency is greater than a preset receiver threshold. The fifth determining sub-module 4037 is configured to determine the communication identification corresponding to this highest use frequency as the frequently-used communication identification if this highest use frequency is greater than the preset receiver threshold.

Figure 9C:
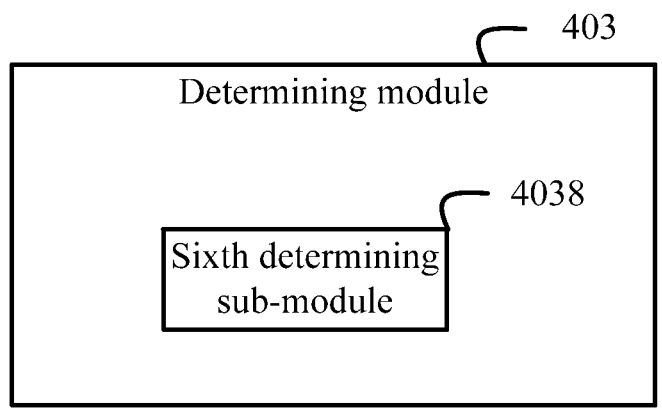
FIG. 9C is a block diagram showing a determining module according to another exemplary embodiment.

In some embodiments, as shown in FIG. 9C, the determining module 403 includes a sixth determining sub-module 4038 configured to determine the use frequencies of the respective communication identifications when used as receivers according to connection states of the communication records and weights corresponding to the connection states. For example, the communication records are call records, and the connection states includes a state in which there is a call signal and the called party answers, a state in which there is a call signal and the called party does not answer, and a state in which there is no call signal. These connection states are respectively assigned the above-described third weight, fourth weight, and fifth weight, where the third weight is greater than the fourth weight and the fourth weight is greater than the fifth weight.

Figure 10:
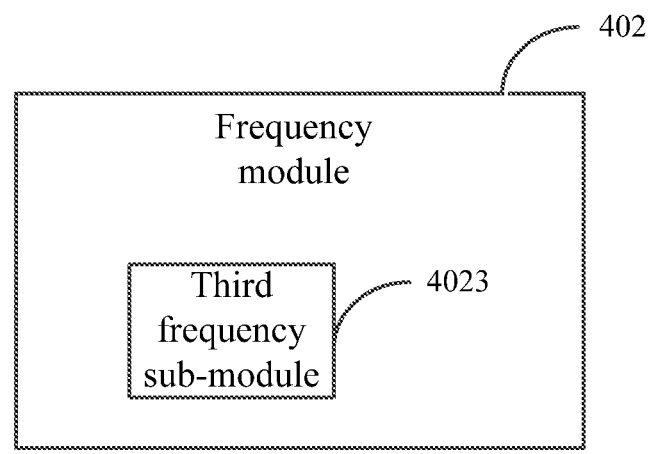
FIG. 10 is a block diagram showing a frequency module according to a further exemplary embodiment.

In some embodiments, as shown in FIG. 10, the frequency module 402 includes a third frequency sub-module 4023 configured to determine the use frequencies of the respective communication identifications according to the timing and numbers of the communication records obtained in a preset time period.

For the devices described above, detailed descriptions of operation of each module are similar to those for the above-described methods, and thus are omitted here.

Figure 11:
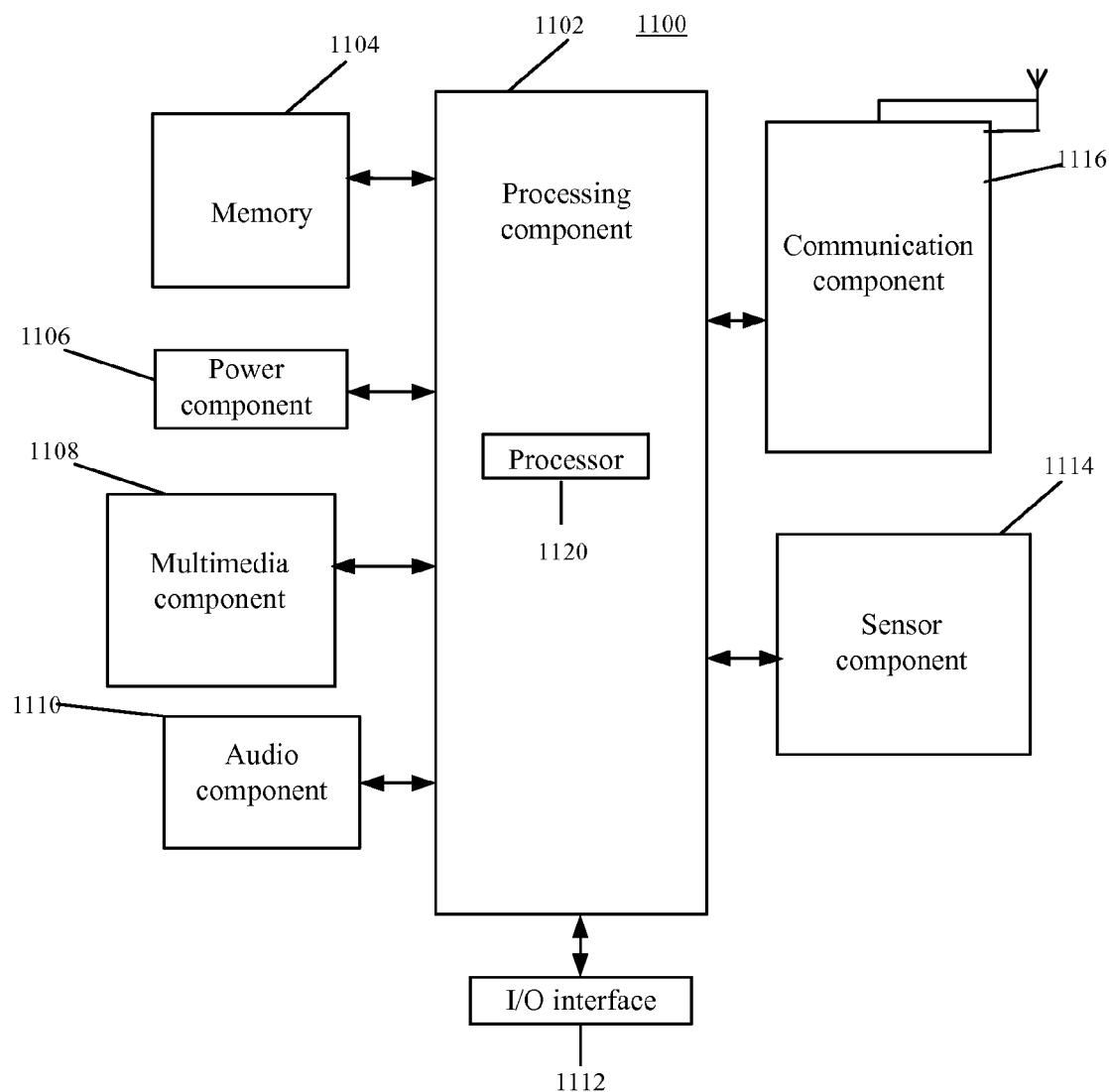
FIG. 11 is a block diagram showing an apparatus according to another exemplary embodiment.

FIG. 11 is a block diagram showing a device 1100 for processing communication identifications according to an exemplary embodiment. For example, the device 1100 may be a mobile phone, a computer, a digital broadcast terminal, a messaging device, a gaming console, a tablet, a medical device, exercise equipment, a personal digital assistant (PDA), or the like.

Referring to FIG. 11, the device 1100 includes one or more of the following components: a processing component 1102, a memory 1104, a power component 1106, a multimedia component 1108, an audio component 1110, an input/output (I/O) interface 1112, a sensor component 1114, and a communication component 1116.

The processing component 1102 usually controls overall operations of the device 1100, such as the operations associated with display, telephone calls, data communications, camera operations, and recording operations. The processing component 1102 may include one or more processors 1120 to execute instructions to perform all or part of the steps in the above described methods. Moreover, the processing component 1102 may include one or more modules which facilitate the interaction between the processing component 1102 and other components. For instance, the processing component 1102 may include a multimedia module to facilitate the interaction between the multimedia component 1108 and the processing component 1102.

The memory 1104 is configured to store various types of data to support the operation of the device 1100. Examples of such data include instructions for any application or method operated on the device 1100, contact data, phonebook data, messages, pictures, videos, etc. The memory 1104 may be implemented using any type of volatile or non-volatile memory device or combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 1106 provides power to various components of the device 1100. The power component 1106 may include a power management system, one or more power sources, and other components associated with the generation, management, and distribution of power in the device 1100.

The multimedia component 1108 includes a screen providing an output interface between the device 1100 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, slips, and gestures on the touch panel. The touch sensors may not only sense a boundary of a touch or slip action, but also sense a period of time and a pressure associated with the touch or slip action. In some embodiments, the multimedia component 1108 includes a front camera and/or a rear camera. The front camera and/or the rear camera may receive an external multimedia datum while the device 1100 is in an operation manner, such as a photographing manner or a video manner. Each of the front camera and the rear camera may be a fixed optical lens system or have focus and optical zoom capability.

The audio component 1110 is configured to output and/or input audio signals. For example, the audio component 1110 includes a microphone (MIC) configured to receive an external audio signal when the device 1100 is in an operation manner, such as a call manner, a recording manner, and a voice identification manner. The received audio signal may be further stored in the memory 1104 or transmitted via the communication component 1116. In some embodiments, the audio component 1110 further includes a speaker to output audio signals.

The I/O interface 1112 provides an interface between the processing component 1102 and peripheral interface modules, such as a keyboard, a click wheel, a button, and the like. The button may include, but not limited to, a home button, a volume button, a starting button, and a locking button.

The sensor component 1114 includes one or more sensors to provide status assessments of various aspects of the device 1100. For instance, the sensor component 1114 may detect an open/closed status of the device 1100, relative positioning of components, e.g., the display and the keyboard, of the device 1100, a change in position of the device 1100 or a component of the device 1100, a presence or absence of user contact with the device 1100, an orientation or an acceleration/deceleration of the device 1100, and a change in temperature of the device 1100. The sensor component 1114 may include a proximity sensor configured to detect the presence of nearby objects without any physical contact. The sensor component 1114 may also include a light sensor, such as a CMOS or CCD image sensor, for use in imaging applications. In some embodiments, the sensor component 1114 may also include an accelerometer sensor, a gyroscope sensor, a magnetic sensor, a pressure sensor, or a temperature sensor.

The communication component 1116 is configured to facilitate communication, wired or wirelessly, between the device 1100 and other devices. The device 1100 may access a wireless network based on a communication standard, such as WI-FI, 2G, or 3G, or a combination thereof. In one exemplary embodiment, the communication component 1116 receives a broadcast signal or broadcast associated information from an external broadcast management system via a broadcast channel. In one exemplary embodiment, the communication component 1116 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the device 1100 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above method.

In exemplary embodiments, there is also provided a non-transitory computer-readable storage medium storing instructions, such as those stored in the memory 1104, that, when executed by the processor 1120 in the device 1100, cause the device 1100 to perform part or all of the above-described methods. For example, the non-transitory computer-readable storage medium may be a ROM, a random access memory (RAM), a CD-ROM, a magnetic tape, a floppy disc, an optical data storage device, or the like.

Figure 12:
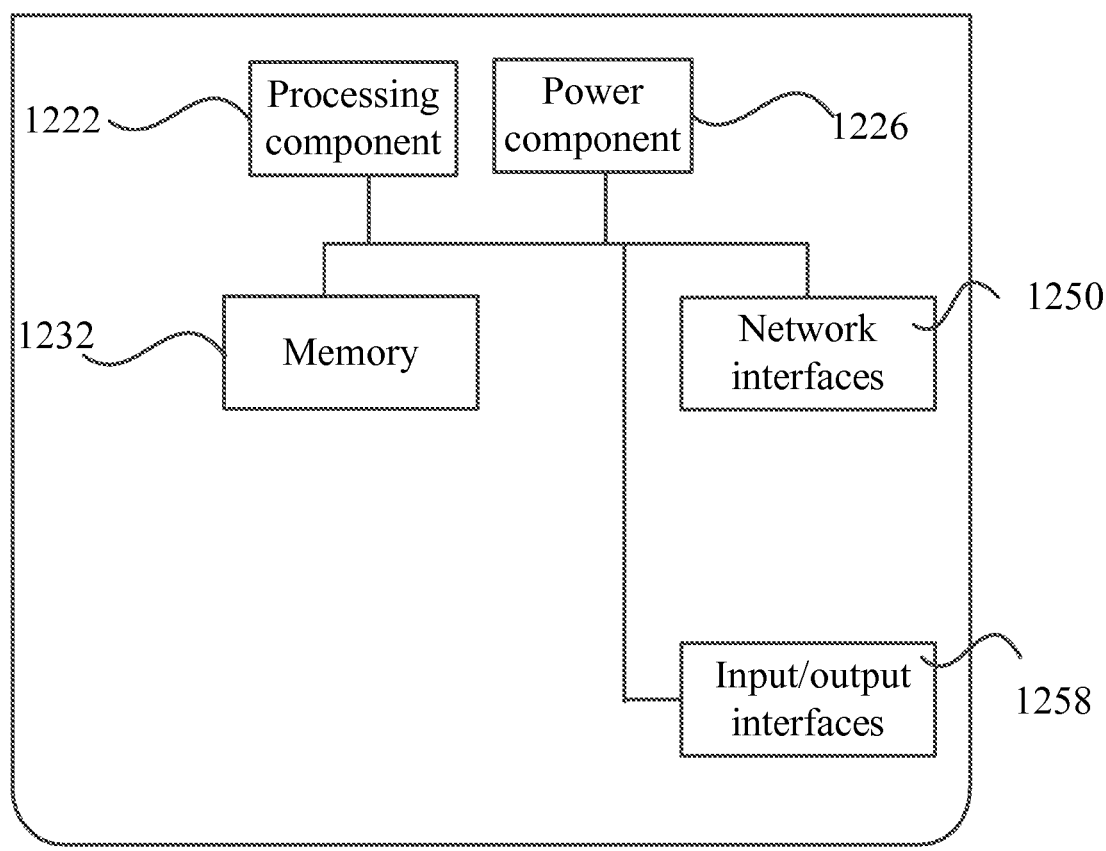
FIG. 12 is a block diagram showing an apparatus according to a further exemplary embodiment.

FIG. 12 is a block diagram of an apparatus 1200 for processing communication identification according to an exemplary embodiment. For example, the apparatus 1200 may be provided as a computer. As shown in FIG. 12, the apparatus 1200 includes a processing component 1222 that further includes one or more processors, and memory resources represented by a memory 1232 for storing instructions, such as application programs, executable by the processing component 1222. The application programs stored in memory 1232 may include one or more modules, each of which corresponds to a set of instructions. Moreover, the processing component 1222 is configured to execute instructions for performing a method for processing communication identifications consistent with embodiments of the present disclosure.

The apparatus 1200 further includes a power component 1226 configured to perform power management of the apparatus 1200, wired or wireless network interface(s) 1250 configured to connect the apparatus 1200 to a network, and an input/output (I/O) interface 1258. The apparatus 1200 may operate an operating system stored in the memory 1232, such as Windows Server™, Mac OS X™, Unix™, Linux™, FreeBSD™, or the like.

According to the present disclosure, there is provided an apparatus for processing communication identifications. The apparatus includes a processor and a non-transitory computer-readable storage medium storing instructions that, when executed by the processor, cause the processor to perform a method for processing communication identifications consistent with embodiments of the present disclosure.

According to the present disclosure, there is also provided a non-transitory computer-readable storage medium storing instructions that, when executed by the processor of a terminal, cause the terminal to execute a method for processing communication identifications consistent with embodiments of the present disclosure.

After considering this description and carrying out the embodiments disclosed herein, those skilled in the art may easily anticipate other implementation aspects of the present disclosure. The present disclosure is meant to cover any variations, usage or adaptive change of these embodiments, and these variations, usage or adaptive change follow general concept of the present disclosure and include the often-used knowledge or the customary technical means in the technical field that is not disclosed in the present disclosure. The description and embodiments are only exemplary, and the real range and spirit of the present disclosure are defined by the following claims.

It should be understood that the present disclosure is not limited to precise structures that are described above and shown in the accompanying drawings, and may be modified and changed without departing from the range of the present disclosure. The scope of the present disclosure is only defined by the appended claims.

What is claimed is:

1. A method, performed by a processor, for processing communication identifications, comprising:
obtaining communication records corresponding to a plurality of communication identifications of a current user;
determining use frequencies of the communication identifications according to the communication records;
determining, according to the use frequencies, one of the communication identifications as a frequently-used communication identification;
generating a markup instruction according to the frequently-used communication identification; and
sending the markup instruction to a terminal storing at least one of the communication identifications of the current user, for the terminal to mark the frequently-used communication identification of the current user.

2. The method according to claim 1, wherein:
determining the use frequencies includes determining, according to the communication records, receiver use frequencies of the communication identifications when the communication identifications are used as receivers, and
determining the one of the communication identifications as the frequently-used communication identification includes determining one of the communication identifications that has a highest receiver use frequency as the frequently-used communication identification.

3. The method according to claim 2, wherein determining the one of the communication identifications that has a highest receiver use frequency as the frequently-used communication identification includes:
determining the highest receiver use frequency among the use frequencies of the communication identifications;
judging whether the highest receiver use frequency is greater than a preset receiver threshold; and
determining, if the highest receiver use frequency is greater than the preset receiver threshold, the communication identification corresponding to the highest receiver use frequency as the frequently-used communication identification.

4. The method according to claim 2, wherein:
the communication records include call records,
determining the receiver use frequencies includes determining the receiver use frequencies according to connection states of the call records and weights of the connection states, and
the connection states include:
a first state in which there is a call signal and a called party answers, the first state having a first weight,
a second state in which there is a call signal and a called party does not answer, the second state having a second weight smaller than the first weight, and
a third state in which there is no call signal, the third state having a third weight smaller than the second weight.

5. The method according to claim 1, wherein:
determining the use frequencies includes determining, according to the communication records, sender use frequencies of the communication identifications when the communication identifications are used as senders, and
determining the one of the communication identifications as the frequently-used communication identification includes determining one of the communication identifications that has a highest sender use frequency as the frequently-used communication identification.

6. The method according to claim 1, wherein:
determining the use frequencies includes:
determining, according to the communication records, sender use frequencies of the communication identifications when the communication identifications are used as senders; and determining, according to the communication records, receiver use frequencies of the communication identifications when the communication identifications are used as receivers, and determining the one of the communication identifications as the frequently-used communication identification includes:

judging, for each of the communication identifications, whether a difference value between the sender use frequency and the receiver use frequency of the communication identification is in a preset difference range and, if so:

determining that the communication identification is a receiver; and determining, as the frequently-used communication identification, one communication identification that has a highest receiver use frequency among the communication identifications that are determined as receivers.

7. The method according to claim 1, wherein determining the use frequencies includes determining the use frequencies of the communication identifications according to timing and numbers of the communication identifications in the communication records obtained in a preset time period.

8. An apparatus for processing communication identification, comprising:

a processor; and a non-transitory computer-readable storage medium storing instructions that, when executed by the processor, cause the processor to:

obtain communication records corresponding to a plurality of communication identifications of a current user;

determine use frequencies of the communication identifications according to the communication records; and determine, according to the use frequencies, one of the communication identifications as a frequently-used communication identification;

wherein the instructions further cause the processor to:

generate a markup instruction according to the frequently-used communication identification; and send the markup instruction to a terminal storing at least one of the communication identifications of the current user, for the terminal to mark the frequently-used communication identification according to the markup instruction.

9. The apparatus according to claim 8, wherein the instructions further cause the processor to:

determine, according to the communication records, receiver use frequencies of the communication identifications when the communication identifications are used as receivers; and determine one of the communication identifications that has a highest receiver use frequency as the frequently-used communication identification.

10. The apparatus according to claim 9, wherein the instructions further cause the processor to:

determine the highest receiver use frequency among the use frequencies of the communication identifications;

judge whether the highest receiver use frequency is greater than a preset receiver threshold; and determine, if the highest receiver use frequency is greater than the preset receiver threshold, the communication identification corresponding to the highest receiver use frequency as the frequently-used communication identification.

11. The apparatus according to claim 9, wherein:

the communication records include call records, the instructions further cause the processor to determine the receiver use frequencies according to connection states of the call records and weights of the connection states, and the connection states include:

a first state in which there is a call signal and a called party answers, the first state having a first weight, a second state in which there is a call signal and a called party does not answer, the second state having a second weight smaller than the first weight, and a third state in which there is no call signal, the third state having a third weight smaller than the second weight.

12. The apparatus according to claim 8, wherein the instructions further cause the processor to:

determine, according to the communication records, sender use frequencies of the communication identifications when the communication identifications are used as senders; and determine one of the communication identifications that has a highest sender use frequency as the frequently-used communication identification.

13. The apparatus according to claim 8, wherein the instructions further cause the processor to:

determine, according to the communication records, sender use frequencies of the communication identifications when the communication identifications are used as senders;

determine, according to the communication records, receiver use frequencies of the communication identifications when the communication identifications are used as receivers;

judge, for each of the communication identifications, whether a difference value between the sender use frequency and the receiver use frequency of the communication identification is in a preset difference range and, if so:

determine that the communication identification is a receiver; and determine, as the frequently-used communication identification, one communication identification that has a highest receiver use frequency among the communication identifications that are determined as receivers.

14. The apparatus according to claim 8, wherein the instructions further cause the processor to:

determine the use frequencies of the communication identifications according to timing and numbers of the communication identifications in the communication records obtained in a preset time period.

15. A non-transitory computer-readable storage medium storing instructions that, when executed by a processor of a terminal, cause the terminal to:

obtain communication records corresponding to a plurality of communication identifications of a current user;

determine use frequencies of the communication identifications according to the communication records;

determine, according to the use frequencies, one of the communication identifications as a frequently-used communication identification;

generate a markup instruction according to the frequently-used communication identification; and send the markup instruction to another terminal storing at least one of the communication identifications of the current user, for the other terminal to mark the frequently-used communication identification according to the markup instruction.

* * * * *